United States Patent [19]
Dielacher et al.

[11] Patent Number: 5,789,959
[45] Date of Patent: Aug. 4, 1998

[54] CIRCUIT CONFIGURATION FOR DIRECT VOLTAGE AND ALTERNATING VOLTAGE DECOUPLING

[75] Inventors: Franz Dielacher, Villach; Berndt Pilgram, Arriach; Joerg Hauptmann, Villach, all of Austria

[73] Assignee: Siemens Aktiengesellschaft, Munich, Germany

[21] Appl. No.: 723,976

[22] Filed: Sep. 30, 1996

[30] Foreign Application Priority Data

Sep. 29, 1995 [DE] Germany .................. 195 36 520.8

[51] Int. Cl.$^6$ .................................................. H04M 19/00
[52] U.S. Cl. .......................... 327/303; 327/168; 327/304; 327/320
[58] Field of Search ........................ 327/168, 181, 327/190, 300, 303, 304, 302, 318, 319, 320, 324, 330, 333, 493, 540

[56] References Cited

U.S. PATENT DOCUMENTS 4,972,517 11/1990 Kondou et al. ............... 327/108
5,629,841 5/1997 Attwood ........................ 363/21

FOREIGN PATENT DOCUMENTS

0590242A1  4/1994  European Pat. Off.
3826765C2  10/1991  Germany.

OTHER PUBLICATIONS

"Spannungsversorgung im ISDN", Siemens Components, 27 (1989), No. 3, pp. 106–108.

Primary Examiner—Timothy P. Callahan
Assistant Examiner—T. T. Lam
Attorney, Agent, or Firm—Laurence A. Greenberg; Herbert L. Lerner

[57] ABSTRACT

Direct voltage and alternating voltage signals are decoupled from a first and a second pair of leads. The pairs of leads each carry an alternating voltage signal and they are subject to a direct voltage between them. A capacitive connection of the leads with the inputs of a signal receiving device allows decoupling of the alternative voltage signal. For decoupling one pole of the direct voltage signal, diodes are provided that are connected to the leads of the respective pair of leads. The diodes are each connected via a respective current source transistor to one terminal for the pole of the direct voltage. The control terminals of the current source transistors are controlled by the center tap of a voltage divider connected between the diodes. The embodiment for direct voltage decoupling is readily integratable.

6 Claims, 1 Drawing Sheet

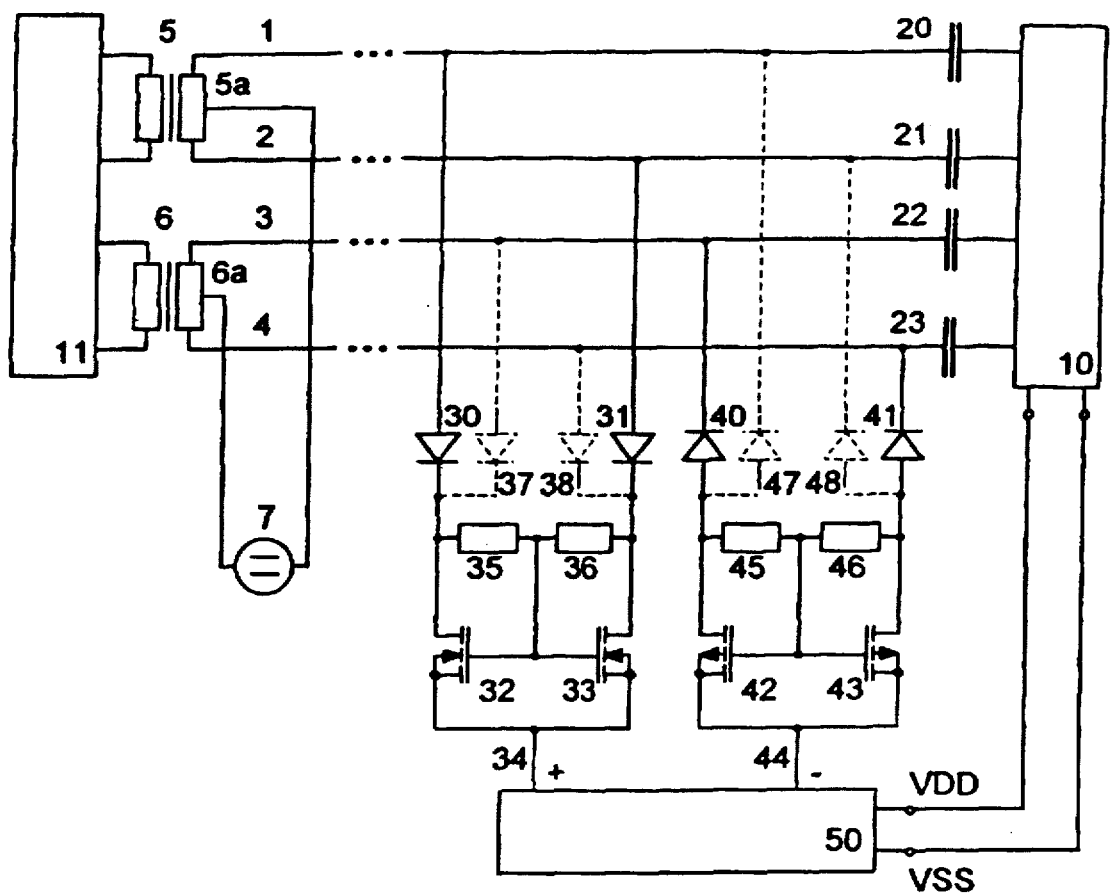

1

CIRCUIT CONFIGURATION FOR DIRECT VOLTAGE AND ALTERNATING VOLTAGE DECOUPLING

BACKGROUND OF THE INVENTION

FIELD OF THE INVENTION

The invention relates to a circuit configuration for direct voltage and alternating voltage decoupling, in which the leads of one pair of leads each carry an alternating voltage signal and a direct voltage is present between the pairs of leads, and the direct voltage is tapped via diodes connected to the leads.

Such circuit configurations are used for instance in digital telecommunications, in ISDNs (Integrated Services Digital Network) at the four-wire interface for connecting a terminal device to the ISDN. This arrangement is known as an S-bus interface. In the literature in Siemens Components, 27 (1989), No. 3, "Spannungsversorgung im ISDN" [Voltage Supply in the ISDN], pp. 106–108, one example of an application for the voltage supply in the terminal device at an S-bus terminal is described. The sending and receiving pairs of leads are terminated with a repeater whose output side feeds into the input circuit of the ISDN base terminal. The poles of a direct voltage are tapped by means of a center-point tapping of the network-side winding of the repeater. A regulated constant voltage is generated by means of a clocked voltage regulator, by which the functional units of the terminal device are supplied with voltage.

Since the supply current for the terminal device flows through the transformers toward the terminal device, the transformers are premagnetized. To allow decoupling a useful signal on the secondary side thereof with as little distortion as possible, special demands must be made with regard to the linearity of the transformers. This makes such transformers complicated to produce and accordingly expensive.

A circuit configuration for supplying a terminal device in a communications network is described in European patent publication EP 0 590 242 A1, for instance. The leads of that configuration carry an alternating signal in pairs, and a direct voltage that is fed to the on the network side is present between the pairs of leads. The leads are capacitively connected to the terminal device for the purpose of alternating voltage decoupling. On the terminal device side, electronic chokes are connected to the leads of each pair of leads, so that from each pair of leads, one pole of the direct voltage is tapped. On the side remote from the terminal device of the connecting node of a lead to one choke each, the anode-to-cathode path of a diode is connected in each lead. The diodes of a pair of leads have the same orientation relative to one another, while the diodes of different pairs of leads have opposed orientation. The diodes serve the purpose of polarity reversal protection.

SUMMARY OF THE INVENTION

It is accordingly an object of the invention to provide a circuit configuration for direct voltage and alternating voltage decoupling, which overcomes the above-mentioned disadvantages of the heretofore-known devices and methods of this general type and which is more highly integrated and can thus be produced more economically.

With the foregoing and other objects in view there is provided, in accordance with the invention, a circuit configuration for direct voltage and alternating voltage decoupling from first and second pairs of leads, wherein the leads of the pairs of leads are connected to inputs of a signal receiving device, and the pairs of leads each carry an alternating voltage signal and being subject to a direct voltage therebetween, comprising:

a first terminal for tapping a potential of the direct voltage across the leads of the first pair of leads, the first terminal being connected to each of the leads of the first pair of leads through a respective first diode with a given forward direction and a respective first transistor having a load current path connected between the first diode and the terminal;

a second terminal for tapping a potential of the direct voltage across the leads of the second pair of leads, the second terminal being connected to each of the leads of the second pair of leads through a respective second diode with a forward direction opposite the given forward direction, and a respective second transistor having a load current path connected between the second diode and the second terminal;

and the first transistors being controlled by a voltage tapped between the first diodes and the second transistors being controlled by a voltage tapped between the second diodes.

In other words, a repeater for decoupling direct and useful signal alternating voltages is no longer necessary in the circuit configuration of the invention. Instead, semiconductor components are used. They can be integrated with an integrated circuit, preferably a voltage regulator, by which the supply voltage on the terminal device side is furnished from the direct voltage transmitted.

In accordance with an added feature of the invention, the circuit further comprises a first voltage divider with a center tap connected between the first diodes, and a second voltage divider with a center tap connected between the second diodes, the first diodes also being connected to one another through a series circuit of the load paths of the first transistors, and the second diodes also being connected to one another through a series circuit of the load paths of the second transistors; each of the first transistors having a control electrode connected to the other the control electrode and to the center tap of the first voltage divider, each of the second transistors having a control electrode connected to the other the control electrode and to the center tap of the second voltage divider; and the load paths of the first transistors having a common coupling node connected to the first terminal, and the load paths of the second transistors having a common coupling node connected to the second terminal.

In accordance with an additional feature of the invention, the circuit is provided with further first diodes with the given forward direction connected to the first diodes, the further first diodes being connected to the leads of the second pair of leads; and including further second diodes with the forward direction opposite the given forward direction connected to the second diodes, the further second diodes being connected to the leads of the first pair of leads.

In accordance with another feature of the invention, the first transistors and the second transistors are of mutually opposite conductivity type.

In accordance with again an added feature of the invention, there is provided a voltage regulator having an input side connected to the first and second terminals for tapping the direct voltage to be transmitted, and an output side with a regulated supply voltage connected to the signal receiving device. In accordance with a concomitant feature of the invention, the leads are capacitively coupled to the inputs of the signal receiving device.

Other features which are considered as characteristic for the invention are set forth in the appended claims.

Although the invention is illustrated and described herein as embodied in a circuit configuration for direct voltage and alternating voltage decoupling, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE DRAWING

The sole FIGURE is a circuit diagram of the configuration according to the invention.

DESCRIPTION OF THE PREFERRED EMBODIMENT

Referring now to the FIGURE of the drawing in detail there is seen an S-bus transmission device with the circuit according to the invention for decoupling direct and alternating voltage signals at a terminal device. The circuit includes a first pair of leads 1, 2, by way of which a useful signal is transmitted to the terminal device, the useful signal being fed there into the receiving component 10. A second pair of leads 3, 4 serves to transmit alternating signals in the return channel. One repeater 5, 6 each is provided on the network side, by which the useful signals are injected into the leads 1, 2 or decoupled from the leads 3, 4 in the interface adapter 11. The windings 5a, 6a on the terminal device side of the repeaters 5 and 6, respectively, serve the purpose of direct voltage injection. To that end, one center-point tap is provided for each of the windings 5a and 6a, between which a voltage source 7 is connected. Thus a direct voltage furnished by the voltage source 7 is present between the pair of leads 1, 2 and the pair of leads 3, 4.

A first useful signal is transmitted over the leads 1, 2 and a second useful signal is transmitted over the leads 3, 4. The useful signals are differential useful signals; that is, the signal on one lead of the pair of leads is inverted relative to the signal of the other lead of the pair of leads. The supply voltage of the voltage source 7 is 40 V, for instance; the positive pole is connected to the repeater 5, and the negative pole to the repeater 6. This so-called S-bus serves to transmit direct and useful signals between a telephone exchange, in which the device 11 is disposed, and a terminal device of a telephone subscriber, in which the interface component 10 is disposed.

For injecting alternating voltage into the interface component 10 of the terminal device, or in other words for injection of the useful signal, one capacitor 20, 21, 22, 23 is connected into each of the leads 1, 2, 3, 4, and by means of it direct voltage signals are isolated. For decoupling of the direct voltage on the side toward the terminal device, one diode 30 connected to the lead 1 and one diode 31 connected to the lead 2 are provided. The anodes of the diodes 30, 31 are connected to the leads 1, 2. The cathodes of the diodes 30, 31 are connected, each via a respective current source 32, 33, to a terminal 34 at which the positive pole of the direct voltage to be transmitted over the leads is tapped. The current sources 32, 33 are embodied as self-locking n-channel MOS transistors. To that end, the load current paths of the transistors, that is, their drain-to-source paths are connected between the diodes and the terminal 34. The terminals of the transistors 32 and 33 connected to the respective diodes 30, 31 act as drain terminals, while the terminals connected to the positive pole 34 act as source terminals of the transistors. To generate a gate-to-source voltage, the coupling nodes between the diodes and the drain terminals of the MOS transistors are connected to one another via a voltage divider 35, 36. The center tap of the voltage divider 35, 36 is jointly connected to the gate terminals of the transistors 32, 33.

At the initially indicated polarity of the direct voltage source 7, the positive potential of the voltage source 7, reduced by the voltage drop at the diodes 30, 31 and also by the voltage drop along the leads 1, 2 from the repeater 5 to the connection point of the diodes 30, 31, is applied to the voltage divider 35, 36. The current that can be drawn at the terminal 34 is furnished by the current source transistors 32, 33 via the diodes 30 and 31, respectively, from the leads 1, 2. If no alternating useful signal is applied to the leads 1, 2, then the same voltage is present at the cathodes of the diodes 30, 31. In the case of a useful signal that is differentially transmitted over the leads 1, 2 with the S-bus, the useful signal difference is present at the cathodes of the diodes 30, 31. On the premise that the resistors 35, 36 and the diodes 30, 31 are each embodied with as much as possible identical component parameters, the potential at the center tap of the voltage divider 35, 36 remains unchanged. The drive of the transistors 32, 33 is therefore unchanged by the useful signal if these transistors also have as identical parameters as possible. It is important that component parameters of the elements 30, 35, 32 match as well as possible the parameters of the elements 31, 36, 33, or in other words be substantially identical, so that both current paths are dimensioned symmetrically relative to one another, and differential useful signals do not become operative in the drive of the transistors 32, 33. If the elements 30 . . . 36 are integrated on a single integrated semiconductor chip, then this condition can be considered empirically to be relatively well fulfilled.

To furnish the negative pole of the direct voltage to be transmitted at a negative terminal 44, diodes 40, 41 are provided, with the reverse orientation of the diodes 30, 31. The diodes 40, 41 are connected to the leads 3, 4, which are supplied from the negative pole of the supply voltage source 7. As current sources, MOS transistors 42, 43 of the opposite polarity, that is, self-locking p-channel MOS transistors, are provided. To that end, the load current path of the transistors is connected between the diodes and the terminal 44. A voltage divider 45, 46 correspondingly assures the triggering of the transistors 42, 43. In this branch, the current flows from the negative pole 44 via the MOS transistors 42, 43 and the diodes 40, 41 into the leads 3, 4 back to the negative pole of the direct voltage supply source 7. Otherwise, the mode of operation of the circuit portion for decoupling of the negative pole is equivalent to that of the negative decoupling of the positive pole.

To enable a reverse connection of the supply voltage source 7, in which the positive pole is connected to the winding 6a and the negative pole is connected to the winding 5a, further diodes 37, 38, whose anodes are coupled with the leads 3 and 4, respectively, and whose cathodes are connected to the cathodes of the diodes 30, 31, are connected in the branch of the current sources 32, 33—as indicated by dashed lines. In a corresponding manner with reversed orientation, further diodes 47, 48 are provided for decoupling of the negative pole and are connected to the leads 1, 2.

The resistors 35, 36 are dimensioned for high impedance. Because of the symmetrical dimensioning, the current source transistors 32, 33 have high-impedance internal resistors for the differential useful signals. The overall result for the useful signals is therefore a merely high-impedance connection between the leads 1, 2, so that the useful signals are hardly disturbed. A direct current can be drawn with low impedance on the output side of the current source transistors 32, 33 at the positive pole 34. The situation is correspondingly true for the negative pole 44 and the leads 3, 4. The transistors may be MOS transistors, as shown, or alternatively may be bipolar npn or pnp transistors.

The poles 34, 44 of the direct voltage recovered in the terminal device are fed into a voltage regulator 50. The voltage of the voltage source 7 is present at the poles 34, 44, decreased by the voltage drop along the transmission lines, the diodes, and the current sources. The voltage regulator 50, which expediently is a clocked voltage regulator, for instance a switched-mode power supply, generates a supply voltage VDD, VSS from this for supply to the functional units in the terminal device.

As alternative to the embodiment described, the current sources may also be in the form of bipolar transistors, in which case their load current paths, that is, their collector-to-emitter paths, are each connected between the diodes 30, 31, 40, 41 and the terminals to the respective tap 34 or 44 of the applicable voltage pole of the direct voltage. Moreover, the coupling capacitors 20, 21, 22, 23, as an alternative to what is shown in the drawing, may be disposed in the various signal leads 1, 2, 3 or also upstream of the terminal nodes of the diodes 30, 31, 40, 41 on the receiver side. Depending on the dimensioning, embodiments in which the discrete coupling capacitors 20, 21, 22, 23 are left out are also conceivable in principle.

We claim:

1. A circuit configuration for direct voltage and alternating voltage decoupling from first and second pairs of leads, wherein the leads of the pairs of leads are connected to inputs of a signal receiving device, and the pairs of leads each carry an alternating voltage signal and being subject to a direct voltage therebetween, comprising:

a first terminal for tapping a potential of the direct voltage across the leads of the first pair of leads, said first terminal being connected to each of said leads of the first pair of leads through a respective first diode with a given forward direction and a respective first transistor having a load current path connected between said respective first diode and said first terminal;

a second terminal for tapping a potential of the direct voltage across the leads of the second pair of leads, said second terminal being connected to each of said leads of the second pair of leads through a respective second diode with a forward direction opposite the given forward direction, and a respective second transistor having a load current path connected between said respective second diode and said second terminal;

and said first transistors being controlled by a voltage tapped between said first diodes and said second transistors being controlled by a voltage tapped between said second diodes.

2. The circuit configuration according to claim 1, which further comprises a first voltage divider with a center tap connected between said first diodes, and a second voltage divider with a center tap connected between said second diodes, said first diodes also being connected to one another through a series of the load current paths of said first transistors, and said second diodes also being connected to one another through a series of the load current paths of said second transistors; each of said first transistors having a control electrode connected together and to said center tap of said first voltage divider, each of said second transistors having a control electrode connected together and to said center tap of said second voltage divider; and said load current paths of said first transistors having a common coupling node connected to said first terminal, and said load current paths of said second transistors having a common coupling node connected to said second terminal.

3. The circuit configuration according to claim 1, including further first diodes with the given forward direction connected to said first diodes, said further first diodes being connected to the leads of the second pair of leads; and including further second diodes with the forward direction opposite the given forward direction connected to said second diodes, said further second diodes being connected to the leads of the first pair of leads.

4. The circuit configuration according to claim 1, wherein said first transistors and said second transistors are of opposite conductivity type.

5. The circuit configuration according to claim 1, including a voltage regulator having an input side connected to said first and second terminals for tapping the direct voltage to be transmitted, and an output side with regulated supply voltage terminals connected to the signal receiving device.

6. The circuit configuration according to claim 1, wherein the leads are capacitively coupled to the inputs of the signal receiving device.

* * * * *